Jan. 21, 1964 W. R. BANE 3,118,449
PROCESS OF PATCHING HOOFS
Filed Dec. 14, 1962 2 Sheets-Sheet 1
FIG. 1
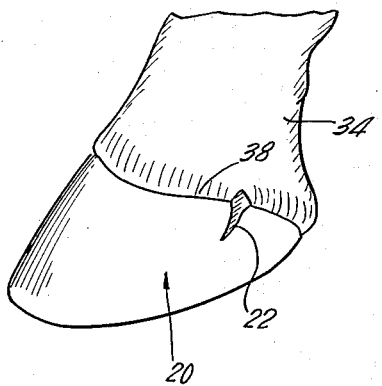
FIG. 2
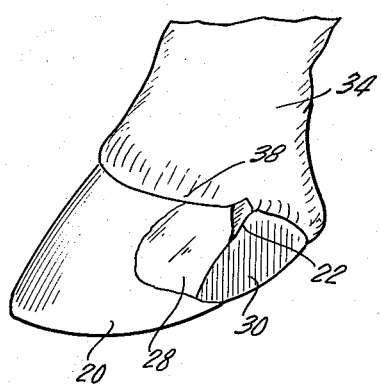
FIG. 3
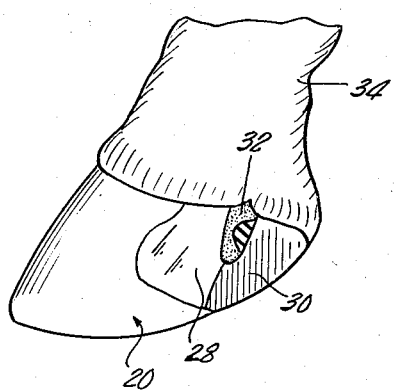
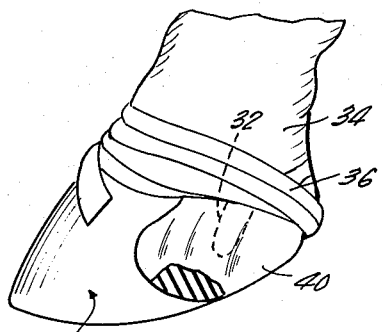
FIG. 5
FIG. 4
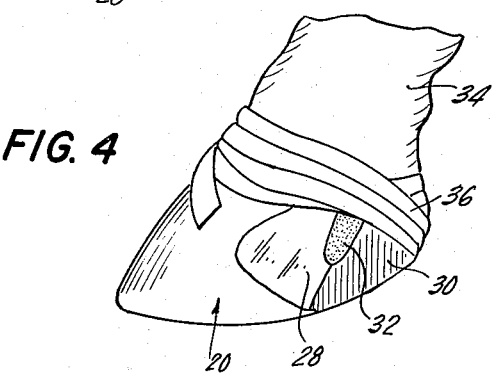
INVENTOR.
WILLIAM R. BANE
BY
*Criskin & Goldfarb*
ATTORNEYS

INVENTOR.
WILLIAM R. BANE
BY
ATTORNEYS

United States Patent Office 3,118,449
Patented Jan. 21, 1964

3,118,449
PROCESS OF PATCHING HOOFS
William R. Bane, 421 Oliveta Place, La Canada, Calif.
Filed Dec. 14, 1962, Ser. No. 244,701
12 Claims. (Cl. 128—336)

This invention relates to animal husbandry and more particularly to a process of fixing and patching the hoofs of animals and particularly those of racing horses.

Thoroughbred and standard bred racing horses are subject to hoof injuries that result in cracks or cavities in the hoofs. Some particularly well-known faults which occur are quarters cracks and seedy toes, as well as other types of injuries such as broken bar, which breaks up through the bottom of a hoof of a horse and which requires patching. Quarter cracks are cracks in the hoofs which result from the pounding received by race horses in action, when the relatively thin hoof tends to develop a crack, generally extending downwardly from the coronet band or just below the coronet band. Such cracks may become infected. The conventional treatment heretofore was to have a veterinarian correct the resulting infection and to remove a section of the hoof and then allow the horse to grow a new hoof. This would normally take the horse out of racing at least for several months and require retraining of the horse so that the horse would not be ready to run again for at least six months and perhaps a longer time, if ever. The seedy toe is a cavity in the horn, usually in the toe which has to be rebuilt. The injuries resulting from a broken bar of the hoof results in a cavity in the hoof since the bar breaks up through the bottom of the hoof.

It is an object of the invention to provide a process whereby the hoof can be strengthened and which allows the horse, immediately after the process according to the invention to be raced without interruption of training.

Another object of the invention to provide a process for enabling horses which are so subject to quarter cracks that they cannot normally be raced but for a short period to have their hoofs strengthened without adversely affecting the horse's gait and which will protect the hoofs from further damage from running so that markedly increased earnings can be obtained from such race horses.

It is a further object of the invention to provide a process for correcting cracks in the hoofs of horses which will enable a horse to be immediately raced after the process has been completed, yet which will permit the new hoof to grow out so that after a suitable period of time, the patch and excessive hoof material may be completely removed with the result that a new hoof will be obtained on which there is neither patch nor crack present.

A still further object of the invention resides in a process for patching quarter cracks and other hoof injuries which process causes no material discomfort to the horse during the patching, which strengthens the hoof of the horse so as to render it less subject to further injury, which permits the horse to be reshod so as to allow for the immediate racing of the horse, and which results in a patch that is free from likelihood of breaking loose or disturbing the gait of a horse.

These, together with the various ancilliary objects and features of the invention which will become apparent as the following description proceeds, are attained by this process of patching a horse's hoof, the steps of the process being illustrated in the accompanying drawings, by way of example only, wherein:

FIG. 1 is a partial view of a hoof of a horse showing a quarter crack in the horse's hoof;

FIG. 2 is an elevational view of the horse's hoof after the hoof has been trimmed and filed to remove excess hoof material;

FIG. 3 is a view of the hoof after the quarter crack has had foam rubber applied thereon for protection of tender spots;

FIG. 4 shows the horse's hoof after tape has been applied about the leg to a position just above the quarter crack;

FIG. 5 is an illustration of the horse's hoof after the patch has been applied;

Figure 11:
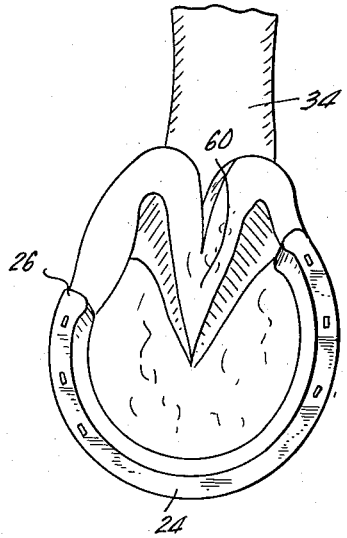
FIG. 11 is a bottom plan view of the horse's hoof which has been patched in accordance with the process and system of the present invention.

With continuing reference to the accompanying drawings wherein like refernce numerals designate similar parts throughout the various views, the process of the present invention is initiated by a verterinarian examining the horse after which the horse is given a tetanus shot and other medication such as antibiotics which the veterinarian believes necessary to insure that the cracked hoof will be or is free of infection. After treatment to remove infection, all of the hoof material of the hoof 20 behind the particular crack, such as the quarter crack 22, is removed. That material which is removed is that determined to be behind the line ascertained by following down the grain of the hoof from the quarter crack. After this removal of the excess hoof material, the horse is then shod. As shown in FIG. 11, the entire shoe 24 is placed ahead of the point determined by following down the grain of the hoof from the quarter crack 22. As can be readily seen in FIG. 11, the shoe 24 is a three-quarter shoe with one inch being cut off at the point 26 so that all of the shoe is ahead of the crack 22. By this means, weight of the horse rests forward on the shoe and not on the hoof portion behind the crack, thereby reducing the tendency for the crack to open and close beneath the patch which is later applied. Of course, when the horse is again raced, there will be no pounding on the hoof to the rear of the crack and thus, since the shoe 24 supports the weight of the horse, the horse may be raced with little likelihood of the crack opening and closing while the horse is racing.

To further assure freedom from infection, promote healing, and to reduce any tenderness, a hot poultice is applied made of fifty percent (50%) bran and fifty percent (50%) flaxseedmeal and left on for twenty-four (24) hours. This hot poultice may be replaced if needed for a second twenty-four hour period. After the required period, the poltice is removed and the hoof is washed and allowed to dry for about five (5) hours. Then, the surface of the hoof is filed and then roughened with emory paper and cleaned with a suitable solvent such as ether or other cleaning solvent. The hoof 20 is thus provided with a base 28 for the patch, and the portion 30 of the hoof to the rear of the crack is trimmed and filed.

If sensitive hoof lamina show through, or there appears to be pressure, a foam rubber cushion 32, consisting of a strip of foam rubber with adhesive backing is applied, as can be seen in FIG. 3. If there is no sensitive area, the crevice of the crack 22 is sealed off with waterproof adhesive tape for a short distance on each side of the crack. This prevents adhesive cement later from coming into contact with any raw area present beneath the crack.

The next step is to cut the patch, which is cut to the shape to be applied to overlie the base 28 and the portion 30 and to substantially overlie the quarter crack 22. The patching material used is synthetic rubber material such as "Neolite," strip material sold by Goodyear Rubber Corporation and designated as their #10 or #12 material. Other synthetic rubber-like material may be used. The leg 34 of the horse is then bandaged using a waterproof adhesive tape 36 about the upper portions of the hoof. Prior to bandaging and if the crack is bleeding, tincture of iodine may be applied from the top of the crack. A reducing medicine may be applied on the coronet band 38 to stimulate hoof growth, and this reducing medicine may be allowed to enter and seal the upper opening of the crack to preclude the entrance of foreign matter. The top of the crack may be left open to insure drainage and release of any gas.

Cementing material is then prepared. This may be an epoxy mastic material as sold under the trademark "Lefkoweld" made by the Leffingwell Chemical Company and conventionally used for bonding hard rubber, metallic ceramics, glass, wood and plastics.

Various types of the "Lefkoweld" adhesives are used, such as type #108, which is used for cracks that are on the side of the hoof with a suitable activator such as sold under the trademark "Lefko F." For cracks further back on the the hoof, type #82, with a type LM-82 activator, is applied. This adhesive material is applied both to the hoof, especially over the portions 28, 30 thereof, and to the patch.

Figure 6:
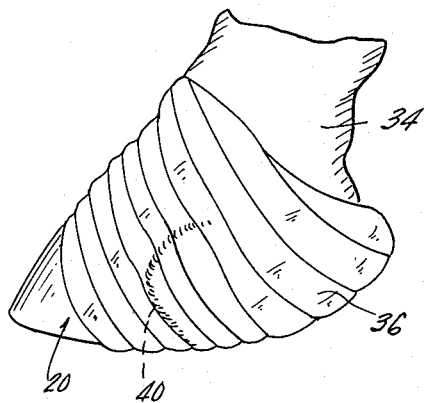
FIG. 6 is a side elevational view of the horse's hoof after the patch has been applied and with the hoof entirely bandaged, using a waterproof adhesive tape.
Figure 7:
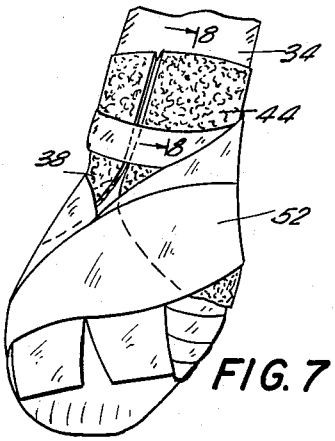
FIG. 7 is a view of the bandaged hoof after a heat-insulating shield has been applied prior to wrapping of the shield with a protective bandage prior to curing of the patch.
Figures 8, 9:
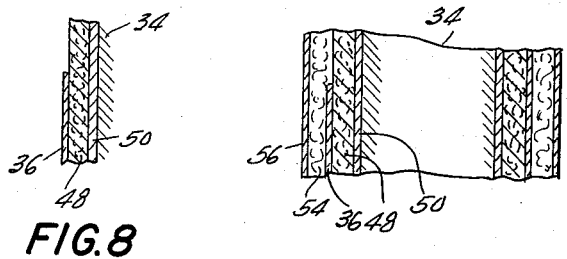
FIG. 8 is a sectional detail view taken along the plane of line 8—8 in FIG. 7.
FIG. 9 is a sectional detail view through the hoof of a horse illustrating the manner in which a protective bandage is applied overlying the heat shield.
Figure 10:
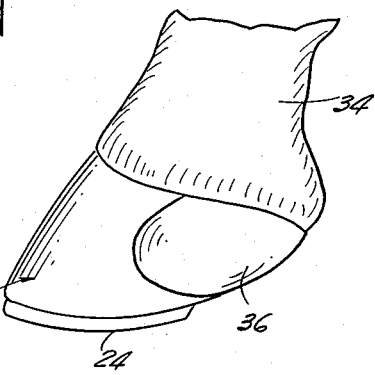
FIG. 10 is an elevational view of the hoof with the bandage and tape removed, with the patch sanded and filed and with the shoe applied.

The patch is applied as shown in FIG. 5, and the tape 36 is passed over the patch 38 with the waterproof adhesive tape entirely covering the patch 38 as shown in FIG. 6. Thereafter, a heat-insulating bandage, including layers of felt 48 and aluminum 50, is placed as a shield over the leg 34 to a position approximately in alignment with the coronet band 38 to protect the hoof from the heat which is to be applied in curing the patch. A protective bandage of cotton 54 and adhesive tape 56 is applied over the shield to securely hold this shield in place. As can be seen in FIG. 8, the completed bandage includes the layer of aluminum 50 and the layer of felt 48 with the cotton layer 54 and outer adhesive tape 56 applied on the horse's leg as shown in FIG. 9 so that the shield and the patch are securely held in place during the curing process. Thereafter, heat is applied through the adhesive tape 36 for curing the patch in any suitable manner and preferably by using a 250 watt infra red lamp. This heat is applied directly to the patch area only and for a period of about one and one-half to two hours depending upon the weather, temperature, draft and other variables, with the action of the horse indicating when the heat has approached the limit which can be applied comfortably to the particular horse. After the curing process has been completed, the protective bandage, the adhesive tape 52, the shield 44, and the tape 36 are removed. The patch is then cleaned up by filling and grinding and sanding until it appears substantially as shown in FIG. 10.

As the hoof grows down in one or two months, generally the patch is removed completely and a new patch is applied, fully covering the crack in the hoof. At this time there is no need to allow for drainage or escape of gas. By the use of this process the hoof can be strengthened and immediately after this process, the horse can use its hoof normally. In a number of cases, horses that would ordinarily have been taken out of races have actually won races without interruption. Many horses are so subject to quarter cracks that they cannot be raced but for a short period, after which they are corrected, rested and retrained if no such patching method, as incorporated in applicant's process, is used. With the use of applicant's process, the entire weakness in the hoof is substantially eliminated and the hoof is so strengthened that the hoof will not be further damaged from running or racing thereafter, even when used on horses heretofore particularly subject to quarter-cracks. This enables such horses to have markedly increased earnings when so treated.

Example: the trotting horse Su Mac Lad. This horse was a free-for-all trotter at the time the horse developed a quarter-crack. Since this horse was an eight-year old gelding at the time, it was feared that if the horse was withdrawn from racing so that the quarter crack could be corrected and the horse rested and retrained, the horse might never attain the racing condition he had reached at the time of the occurrence of the quarter crack. Therefore, it was decided by the owner and trainer of this horse to have applicant employ his process to repair the quarter crack. This was accomplished by eliminating all infection from the affected hoof, removing substantially all of the hoof material behind the crack. Thereafter the horse was shod with the entire shoe in front of the crack to be patched so that the frog at 60, see FIG. 11, would get firmer pressure and take pressure away from both quarters of the shell of the hoof. Thereafter, after treating the hoof to form a base and roughening the base and sealing the crevice formed by the crack for a short distance on either side of the crack for protecting the raw area beneath the crack, a patch of "Neolite" strip material was applied after being shaped to substantially overlie the crack. Reducing medicine was applied on the coronet band to stimulate hoof growth and an epoxy mastic material sold under the trademark "Lefkoweld" #108 was applied to the patch and on the prepared portions of the hoof. Thereafter, the patch was taped on the hoof, using approximately ten yards of waterproof adhesive tape and the patch was then cured by applying heat through the adhesive tape on the patch after an insulating bandage of cotton, felt and aluminum had been applied on the leg of the horse. The heat was applied by a 250 watt infra-red lamp for approximately two hours directly on the area on the patch. Thereafter the tape was removed and the surface of the patch was finished to conform generally to the outlines of the hoof. This process took less than one week and within two weeks after the completion of the process, the horse, Su Mac Lad, was again raced. Thereafter, and for the next three months, Su Mac Lad raced in enough races and won enough races to be voted and acclaimed the 1962 Trotting Horse of the Year, and to become the all-time money-winning trotting horse.

Thus, it can be seen that there has been defined the process of patching a crack in the hoof of a horse which will enable a horse to resist continuing pounding occurring on the hoof due to racing and which will enable the horse to be continually raced so as to not go out of condition or require resting and retraining, but which will allow the horse to remain in racing condition and obtain markedly increased earnings.

A self vulcanizing rubber cement such as "Holdtite" of U.S. Rubber Co. may be used to protect the sensitive hoof lamina in lieu of adhesive tape.

A latitude of modification, change and substitution is intended in the foregoing disclosure and in some instances, some features of the invention will be employed without a corresponding use of other features. Accordingly, it is appropriate that the appended claims be construed broadly and in a manner consistent with the spirit and scope of the invention herein.

I claim:

1. A process of patching a crack in the hoof of a horse comprising the steps of removing substantially all of the hoof material behind the crack to be patched, shoeing the horse with a shoe, with the shoe arranged on the periphery of the hoof so that no pressure is applied adjacent the crack, sealing the crevice formed by the crack for a short distance on either side of said crack to protect the raw area beneath the crack, cutting a patch of rubber-like strip material to a shape to substantially overlie said crack, applying an adhesive material to said patch and said hoof, taping said patch on said hoof with an adhesive tape, applying heat through said adhesive tape on said patch, removing said tape, and then finishing the surface of said patch to conform to the general outline of said hoof.

2. A process of patching a crack in the hoof of a horse comprising the steps of treating the horse to render the horse free of infection, removing substantially all of the hoof material behing the crack to be patched, shoeing the with a shoe, with the shoe arranged on the periphery of the hoof so that no pressure is applied adjacent the crack, applying a hot poultice on said hoof, filing the remaining surface of said hoof adjacent said crack to form a base, roughening said base, sealing the crevice formed by the crack for a short distance on either side of said crack to protect the raw area beneath said crack, cutting a patch of rubber-like strip material to a shape to substantially overlie said crack, applying an epoxy mastic material to said patch and said hoof, taping said patch on said hoof, applying heat through said adhesive tape on said patch, removing said tape, and then finishing the surface of said patch to conform to the general outline of said hoof.

3. A process according to claim 2, including the step of bandaging the leg of the horse adjacent said hoof with a heat-insulating bandage before application of said epoxy mastic material.

4. A process of patching a crack in the hoof of a horse comprising the steps of treating the horse to render the horse free of infection, removing substantially all of the hoof material behind the crack to be patched, shoeing the horse with a shoe with the shoe arranged on the periphery of the hoof so that no pressure is applied adjacent the crack, applying a hot poultice on said hoof, filing the remaining surface of said hoof adjacent said crack to form a base, roughening said base, sealing the crevice formed by the crack for a short distance on either side of said crack to protect the raw area beneath said crack, cutting a patch of rubber-like strip material to a shape to substantially overlie said crack while leaving a small opening at the top of said crack to permit drainage and relief of gas, applying an epoxy mastic material to said patch and said hoof, taping said patch on said hoof, applying heat through said adhesive tape on said patch, removing said tape and then finishing the surface of said patch to conform to the general outline of said hoof.

5. A process according to claim 4 including the step of applying a reducing medicine on the coronet band of the hoof and to the upper opening of said crack to seal said upper opening.

6. A process of patching a crack in the hoof of a horse comprising the steps of removing substantially all of the hoof material behind the crack to be patched, shoeing the horse with a shoe with the shoe arranged on the periphery of the hoof so that no pressure is applied adjacent the crack, applying a hot poultice on said hoof, filing the remaining surface of said hoof adjacent said crack to form a base, roughening said base, sealing of the crevice formed by the crack for a short distance on either side of said crack to protect the raw area beneath the crack, bandaging the leg of the horse adjacent said hoof with a heat-insulating bandage, cutting a patch of rubber-like strip material to a shape to overlie said crack, applying an epoxy mastic material to said patch and said hoof, taping said patch on said hoof, applying heat through said adhesive tape on said patch, removing said tape and then finishing the surface of said patch to conform to the general outline of said hoof.

7. A process according to claim 6 wherein said bandage includes layers of cotton, felt and aluminum foil.

8. A process of patching a crack in the hoof of a horse comprising the steps of treating the horse to render the horse free of infection, removing substantially all of the hoof material behind the crack to be patched, shoeing the horse with a shoe with the shoe arranged on the periphery of the hoof so that no pressure is applied adjacent the crack, applying a hot poultice on said hoof, filing the remaining surface of said hoof adjacent said crack to form a base, roughening said base, sealing the crevice formed by the crack for a short distance on either side of said crack to protect the raw area beneath said crack, cutting a patch of rubber-like strip material to a shape to substantially overlie said crack, applying an epoxy mastic material to said patch and said hoof, taping said patch on said hoof, applying heat through said adhesive tape on said patch using an infra-red lamp for about one and one-half to two hours, removing said tape and then finishing the surface of said patch to conform to the general outline of said hoof.

9. A process according to claim 8 including the step of bandaging the leg of the horse adjacent said hoof with a heat-insulating bandage before application of said epoxy mastic material, said bandage including layers of cotton, felt and aluminum foil.

10. A process according to claim 9 including the step of applying a reducing medicine on the coronet band of the hoof and to the upper opening of said crack to seal said upper opening.

11. A process according to claim 8 wherein as the hoof grows downward, said patch is trimmed off along with excess hoof material to attain a complete hoof with no crack and no patch.

12. A process of patching a crack in the hoof of a horse comprising the steps of treating the horse to render the horse free of infection, removing substantially all of the hoof material behind the crack to be patched, shoeing the horse with a shoe with the shoe arranged on the periphery of the hoof so that no pressure is applied adjacent the crack, applying a hot poultice of fifty percent (50%) bran and fifty percent (50%) flaxseedmeal for about twenty-four (24) hours on said hoof, applying a cushion of foam rubber on sensitive hoof lamina revealed by removal of said hoof material, filing the remaining surface of said hoof adjacent said crack to form a base, roughening said base, sealing of the crevice formed by the crack for a short distance on either side of said crack to protect the raw area beneath said crack, cutting a patch of rubber-like strip material to a shape to overlie said crack, applying an epoxy mastic material to said patch and said hoof, taping said patch on said hoof, applying heat through said adhesive tape on said patch, removing said tape and then finishing the surface of said patch to conform to the general outline of said hoof.

References Cited in the file of this patent

UNITED STATES PATENTS 381,868     Wiestner _____ Apr. 24, 1888

FOREIGN PATENTS 9,234     Great Britain _____ 1899